(12) United States Patent
Becher et al.

(10) Patent No.: US 11,418,029 B2
(45) Date of Patent: *Aug. 16, 2022

(54) METHOD FOR RECOGNIZING CONTINGENCIES IN A POWER SUPPLY NETWORK

(71) Applicant: SIEMENS AKTIENGESELLSCHAFT, Munich (DE)

(72) Inventors: Silvio Becher, Munich (DE); Denis Krompaß, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 114 days.

This patent is subject to a terminal disclaimer.

(21) Appl. No.: 16/627,269

(22) PCT Filed: Jun. 7, 2018

(86) PCT No.: PCT/EP2018/064991
§ 371 (c)(1),
(2) Date: Dec. 27, 2019

(87) PCT Pub. No.: WO2019/001920
PCT Pub. Date: Jan. 3, 2019

(65) Prior Publication Data
US 2020/0169085 A1 May 28, 2020

(30) Foreign Application Priority Data
Jun. 28, 2017 (EP) .................... 17178400

(51) Int. Cl.
H02J 3/00 (2006.01)
G06N 3/04 (2006.01)
(Continued)

(52) U.S. Cl.
CPC .......... *H02J 3/0012* (2020.01); *G06N 3/0445* (2013.01); *G06N 3/0454* (2013.01);
(Continued)

(58) Field of Classification Search
CPC ...... H02J 3/0012; H02J 13/00; H02J 2203/20; H02J 13/00002; H02J 3/003;
(Continued)

(56) References Cited

U.S. PATENT DOCUMENTS

2004/0036478 A1* 2/2004 Logvinov ................ H04B 3/54
324/534
2011/0202191 A1 8/2011 Larsson et al.
(Continued)

FOREIGN PATENT DOCUMENTS

EP 2942855 A1 11/2015
EP 3173991 A1 5/2017

OTHER PUBLICATIONS

European Search Report for European Patent Application No. 17178400.2-1804 dated Sep. 26, 2017.
(Continued)

*Primary Examiner* — Thomas C Lee
*Assistant Examiner* — Charles Cai
(74) *Attorney, Agent, or Firm* — Lempia Summerfield Katz LLC

(57) ABSTRACT

A monitoring system includes in-field measurement devices adapted to generate measurement data of a power supply network, and a processing unit adapted to process the measurement data using a local network state estimation model to calculate local network state profiles used to generate a global network state profile. The processing unit is adapted to process the measurement data to provide a relevance profile comprising, for the in-field measurement devices, a relevance distribution indicating a probability
(Continued)

where an origin of a contingency within the power supply network resides. The processing unit is adapted to compute a similarity between a candidate contingency profile formed by the generated global network state profile and by the calculated relevance profile and reference contingency profiles stored in a reference contingency database of the monitoring system to identify a reference contingency profile having a highest computed similarity as a recognized contingency within the power supply network.

18 Claims, 14 Drawing Sheets

(51) Int. Cl.
*G06Q 50/06* (2012.01)
*H02J 13/00* (2006.01)

(52) U.S. Cl.
CPC ............. *G06Q 50/06* (2013.01); *H02J 13/00* (2013.01); *H02J 2203/20* (2020.01)

(58) Field of Classification Search
CPC ...... G06N 3/0445; G06N 3/0454; G06N 3/08; G06Q 50/06; G06Q 10/0639; G06Q 10/0631; G06Q 10/06315; Y02E 60/00; Y02E 40/70; Y04S 10/30; Y04S 40/20; Y04S 10/50; Y04S 10/22
See application file for complete search history.

(56) References Cited

U.S. PATENT DOCUMENTS

| | | | |
|---|---|---|---|
| 2015/0043410 A1* | 2/2015 | Chaturvedi | H04W 52/0219 370/311 |
| 2015/0127419 A1* | 5/2015 | Tiwari | G06F 16/24578 705/7.29 |
| 2016/0036964 A1* | 2/2016 | Barfield, Jr. | H04W 4/40 455/418 |
| 2016/0350611 A1* | 12/2016 | Zhang | G06K 9/00288 |
| 2017/0148433 A1* | 5/2017 | Catanzaro | G10L 15/183 |
| 2017/0153615 A1* | 6/2017 | Krompa | G06Q 10/06 |
| 2017/0200066 A1* | 7/2017 | Wang | G06K 9/4604 |
| 2017/0351663 A1* | 12/2017 | Sordoni | G06N 3/0454 |
| 2018/0373986 A1* | 12/2018 | Rainwater | G06F 11/36 |
| 2019/0347753 A1* | 11/2019 | Huang | G06Q 10/06311 |

OTHER PUBLICATIONS

PCT International Search Report and Written Opinion for International Application No. PCT/EP2018/064991 dated Aug. 14, 2018.
Behera et al., An Unique Approach for Voltage Stability Improvement with Probabilistic Neural Network, 2015 IEEE, 5 pp. (Year: 2015).
Chiang, Hsiao-Dong, and Wang Lei. "Toward real-time detection of critical contingency of large power systems." 2013 IEEE Power & Energy Society General Meeting IEEE, 2013.
Ugedo et al., Generator Load Profiles Estimation Using Artificial Intelligence, 2007 International Conference on Intelligent SystemsApplications to Power Systems, 6 pp. (Year: 2007).

* cited by examiner

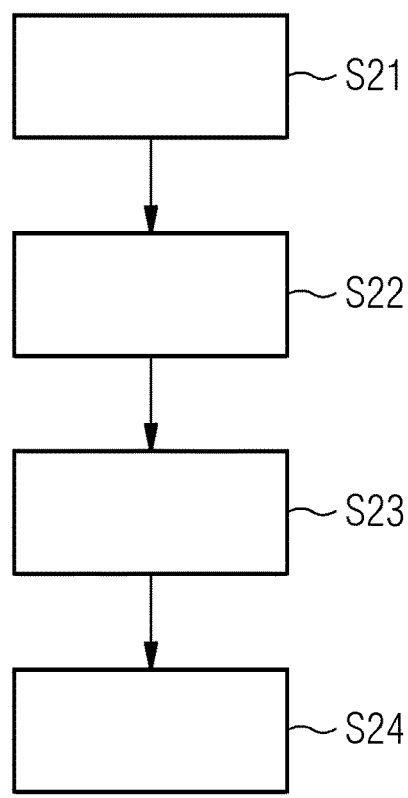
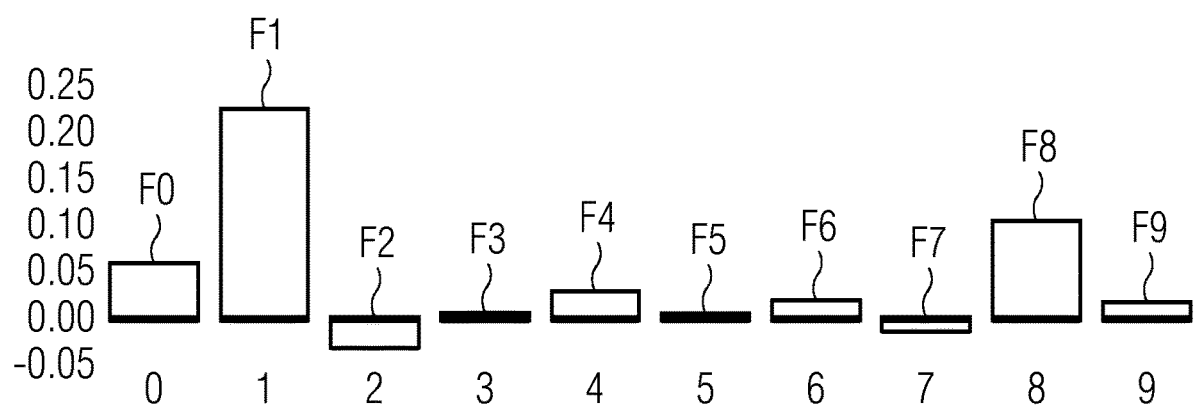

METHOD FOR RECOGNIZING CONTINGENCIES IN A POWER SUPPLY NETWORK

This Application is the National Stage International Application No. PCT/EP2018/064991, filed Jun. 7, 2019, which claims the benefit of European Patent Application No. EP 17178400 2, filed Jun. 28, 2017. The entire contents of these documents are hereby incorporated herein by reference.

BACKGROUND

The present embodiments relate to recognizing contingencies in a power supply network and to a data driven approach for recognizing contingencies in an electrical grid.

A power supply network such as an electrical power supply grid is a complex system including a plurality of subsystems and/or components. These components include in-field measurement devices such as phasor measurement units PMUs. Phasor measurement units may measure electrical waves on an electrical grid. Phasor measurement units may, for example, measure 3-phase current phasors (e.g., magnitude and angle), 3-phase voltage phasors, corresponding frequency. In large power supply networks, the in-field measurement devices (e.g., the PMUs) may be located at strategic sites to monitor the state of the whole power supply network. Different kinds of contingencies may occur in the power supply network. Some contingencies such as generator or line trips may have an impact on the stability of the power supply network and may be visualized through the data that is generated by the in-field measurement devices of the power supply network. In-field measurement devices (e.g., PMUs) may provide measurement data with a high resolution. However, this leads to huge amounts of measurement data generated by the in-field measurement devices that are to be processed by a processing unit. Even though the contingencies in the power supply network may be visualized through the recorded measurement data, the analysis of the received huge amount of measurement data is to be done by experienced engineers manually. The measurement data received by the in-field measurement devices of the power supply network are, for example, analyzed to detect a root cause of the observed contingency. Since the analysis of the huge amount of measurement data is mostly performed manually, the analysis is very cumbersome and time-consuming. In addition, the analysis of the measurement data does not have an impact on the actual decisions that are taken during the event of the contingency due to the large delay of insights about the observed contingency caused by the complex manual analysis. For example, a manual analysis of measurement data received by in-field measurement devices of a power supply network in response to a contingency event may take up to three months. However, in case of a contingency that threatens the stability of the power supply network, decisions are to be made in less than a minute to be effective.

EP 2 924 855 A1 relates to low-cost monitoring method and system for power ddistribution system based on distributed artificial intelligence. A hierarchical bottom-up structure is considered to build up the overall picture of the distribution operating status.

EP 3 173 991 A1 related to a method and apparatus for automatic recognition os similatities between perturbation in a network. The network is a power supply network including a plurality of phase measurement units that measure energy flow parameters.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and system for automatically recognizing contingencies in a power supply network in short time are provided.

The present embodiments provide, according to a first aspect, a method for recognizing a contingency in a power supply network. The method includes processing measurement data generated by in-field measurement devices of the power supply network by a local network state estimation model to calculate local network state profiles. A global network state profile is generated from the local network state profiles. The measurement data generated by the in-field measurement devices of the power supply network is processed to provide a relevance profile including, for the in-field measurement devices, a relevance distribution indicating a probability where the origin of a contingency within the power supply network resides. A similarity between a candidate contingency profile being formed by the generated global network state pro-file and formed by the calculated relevance profile and reference contingency profiles stored in a reference contingency database is computed to identify the reference contingency profile having the highest computed similarity as the recognized contingency.

In a possible embodiment of the method for recognizing a contingency in a power supply network according to the first aspect of the present embodiments, the local network state profile includes a local contingency class probability profile including, for the in-field measurement devices, a class probability distribution over contingency classes.

In a further possible embodiment of the method according to the first aspect of the present embodiments, the local network state profile includes a local latent contingency profile.

In a still further possible embodiment of the method according to the first aspect of the present embodiments, the in-field measurement devices include phasor measurement units that provide time series of measurement data in different measurement channels.

In a still further possible embodiment of the method for recognizing a contingency in a power supply network according to the first aspect of the present embodiments, the local network state estimation model is formed by a model that generates a latent feature representation of the local network state such as a tensor factorization model.

In a still further possible embodiment of the method according to the first aspect of the present embodiments, each reference contingency profile stored in the reference contingency database includes a reference global network state profile and a reference relevance profile.

In a still further possible embodiment of the method according to the first aspect of the present embodiments, a similarity metric indicating a similarity between the candidate contingency profile and a reference contingency profile is computed for each reference contingency profile stored in the reference contingency database depending on the global network state profile of the candidate contingency profile and depending on the global network state profile of the respective reference contingency profile.

In a still further possible embodiment of the method according to the first aspect of the present embodiments, the used similarity metric includes a weighted cosine similarity metric.

In a still further possible embodiment of the method according to the first aspect of the present embodiments, the measurement data generated by each in-field measurement device of the power supply network is preprocessed to provide a standard deviation of the measurement data from an expected value in a steady state for each measurement channel of the respective in-field measurement device.

In a still further possible embodiment of the method according to the first aspect of the present embodiments, the preprocessed measurement data is rescaled by dividing the preprocessed measurement data through the channel and in-field measurement device specific standard deviation.

In a still further possible embodiment of the method according to the first aspect of the present embodiments, a relevance weight is calculated for each in-field measurement device by normalizing the standard deviation of the measurement data of the respective in-field measurement device to provide the relevance profile.

In a still further possible embodiment of the method according to the first aspect of the present embodiments, the local network state estimation models are trained with measurement data of observed contingencies of the power supply network.

The present embodiments further provide, according to a second aspect, a monitoring system adapted to recognize a contingency in a power supply network.

The present embodiments provide, according to a second aspect, a monitoring system adapted to recognize a contingency in a power supply network. The monitoring system includes in-field measurement devices adapted to generate measurement data of the power supply network, and a processing unit adapted to process the measurement data generated by the in-field measurement devices of the power supply network by using a local network state estimation model to calculate local network state profiles and to generate a global network state profile. The processing unit is further adapted to process the measurement data generated by the in-field measurement devices of the power supply network to provide a relevance profile including, for the in-field measurement devices, a relevance distribution indicating a probability where the origin of a contingency within the power supply network resides. The processing unit is further adapted to compute a similarity between a candidate contingency profile formed by the generated global network state profile and by the calculated relevance profile and reference contingency profiles stored in a reference contingency database of the monitoring system to identify the reference contingency profile having the highest computed similarity as the recognized contingency within the power supply network.

In a possible embodiment of the monitoring system according to the second aspect of the present embodiments, the in-field measurement devices include phasor measurement units that are adapted to provide time series of measurement data in different measurement channels.

The present embodiments further provide, according to a third aspect, a method for recognizing contingencies in a power supply network. The method includes processing measurement data generated by in-field measurement devices of the power supply network by associated neural attention models to provide a global network state profile of the power supply network including, for the in-field measurement devices of the power supply network, a class probability distribution over contingency classes. The measurement data generated by the in-field measurement devices of the power supply network is processed to provide a relevance profile of the power supply network including, for the in-field measurement devices, a relevance distribution indicating a probability where the origin of a contingency within the power supply network resides. The calculated global network state profile of the power supply network and the calculated relevance profile of the power supply network are compared with reference contingency profiles stored in a reference contingency database to recognize contingencies in the power supply network.

In a possible embodiment of the method according to the third aspect of the present embodiments, each neural attention model associated with a corresponding in-field measurement device is used to calculate a local network state profile for the power supply network at the respective in-field measurement device.

In a further possible embodiment of the method according to the third aspect of the present embodiments, the local network state profiles of the different in-field measurement devices are concatenated to provide the global network state profile of the power supply network.

In a still further possible embodiment of the method according to the third aspect of the present embodiments, the in-field measurement devices include phasor measurement units that provide time series of measurement data in different measurement channels.

In a still further possible embodiment of the method according to the third aspect of the present embodiments, the neural attention model includes a convolutional layer to smooth measurement data received by an associated in-field measurement device of the power supply network.

In a still further possible embodiment of the method according to the third aspect of the present embodiments, the neural attention model associated with a corresponding in-field measurement device of the power supply network includes at least one recurrent neural network layer to capture the time dependency of the received measurement data.

In a still further possible embodiment of the method according to the third aspect of the present embodiments, the neural attention model associated with an in-field measurement device of the power supply network includes an attention layer that weights outputs of the last recurrent neural network layer of the neural attention model with the output of an associated feed-forward attention subnetwork receiving channel-wise context information data indicating a steady state of the power supply network at the respective in-field measurement device.

In a still further possible embodiment of the method according to the third aspect of the present embodiments, the neural attention model associated with a corresponding in-field measurement device of the power supply network includes a classification layer that receives the weighted outputs of the last recurrent neural network layer of the neural attention network to calculate a local network state profile for the power supply network at the respective in-field measurement device indicating a predicted class probability distribution over contingency classes.

In a still further possible embodiment of the method according to the third aspect of the present embodiments, each reference contingency profile stored in the reference contingency database includes a reference global network state profile and a reference relevance profile.

In the method according to the third aspect of the present embodiments, a similarity metric indicating a similarity between a candidate contingency profile formed by the global network state profile and the relevance profile of the power supply network and a reference contingency profile is computed for each reference contingency profile stored in the reference contingency database depending on the global network state profile of the candidate contingency profile and depending on the global network state profile of the respective reference contingency profile.

In a still further possible embodiment of the method according to the third aspect of the present embodiments, for each reference contingency profile stored in the reference contingency database, a first similarity metric is calculated depending on the global network state profile of the candidate contingency profile and depending on the global network state profile of the reference contingency profile. A second similarity metric is computed depending on the relevance profile of the candidate contingency profile and depending on the relevance profile of the reference contingency profile.

In a still further possible embodiment of the method according to the third aspect of the present embodiments, a similarity metric indicating a similarity between the candidate contingency profile and the reference contingency profile is computed as a function of the calculated first similarity metric and the calculated second similarity metric.

In a further possible embodiment of the method according to the third aspect of the present embodiments, a similarity metric indicating a similarity between the candidate contingency profile and a reference contingency profile is computed as an average of the first similarity metric and the second similarity metric.

In a possible embodiment of the method according to the third aspect of the present embodiments, the measurement data generated by each in-field measurement device of the power supply network is preprocessed to provide a standard deviation of the measurement data from an expected value in a steady state for each measurement channel of the respective in-field measurement device.

In a possible embodiment of the method according to the third aspect of the present embodiments, the preprocessed measurement data is rescaled by dividing the preprocessed measurement data through the channel and in-field measurement device specific standard deviation.

In a further possible embodiment of the method according to the third aspect of the present embodiments, a relevance weight is calculated for each in-field measurement device by normalizing the standard deviation of the measurement data of the respective in-field measurement device to provide the relevance profile of the power supply network.

In a further possible embodiment of the method according to the third aspect of the present embodiments, the neural attention models are trained with measurement data of observed contingencies of the power supply network.

The present embodiments further provide, according to a fourth aspect, a monitoring system adapted to recognize contingencies in a power supply network. The monitoring system includes in-field measurement devices adapted to generate measurement data of the power supply network, and a processing unit adapted to process the measurement data generated by the in-field measurement devices of the power supply network by associated neural attention models to provide a global network state profile of the power supply network including, for the in-field measurement devices of the power supply network, a class probability distribution over contingency classes. The processing unit is further adapted to process the measurement data generated by the in-field measurement devices of the power supply network to provide a relevance profile of the power supply network including, for the in-field measurement devices, a relevance distribution indicating a probability where the origin of a contingency within the power supply network resides. The processing unit is further adapted to compare the calculated global network state profile of the power supply network and the calculated relevance profile of the power supply network with reference contingency profiles stored in a reference contingency database of the monitoring system to recognize contingencies in the power supply network.

In a possible embodiment of the monitoring system according to the fourth aspect of the present embodiments, the in-field measurement devices include phasor measurement units that provide time series of measurement data in different measurement channels.

In a possible embodiment of the monitoring system according to the fourth aspect of the present embodiments, each neural attention model includes a convolutional layer adapted to smooth measurement data received by an associated in-field measurement device of the power supply network, at least one recurrent neural network layer adapted to capture a time dependency of the received measurement data, and a classification layer adapted to weight the received outputs of the last recurrent neural network layer of the neural attention network to calculate a local network state profile for the power supply network at the respective in-field measurement device indicating a predicted class probability distribution over contingency classes.

BRIEF DESCRIPTION OF THE DRAWINGS

In the following, possible embodiments of different aspects of the present embodiments are described in more detail with reference to the enclosed figures.

In the cases where the modelling of long-term dependencies is required, the recurrent neural network layer consists of Gated Recurrent Units (GRUs) of Long-Term Short-Term Memory (LSTM), which enable the network to capture these long term dependencies.

FIG. 2 shows a flowchart of a possible exemplary embodiment of a method for recognizing a contingency in a power supply network;

FIG. 3 shows a diagram for illustrating a local network state computed from measurement data generated by an in-field measurement device to illustrate a possible exemplary embodiment of a method for recognizing a contingency in a power supply network;

DETAILED DESCRIPTION

Figure 1:
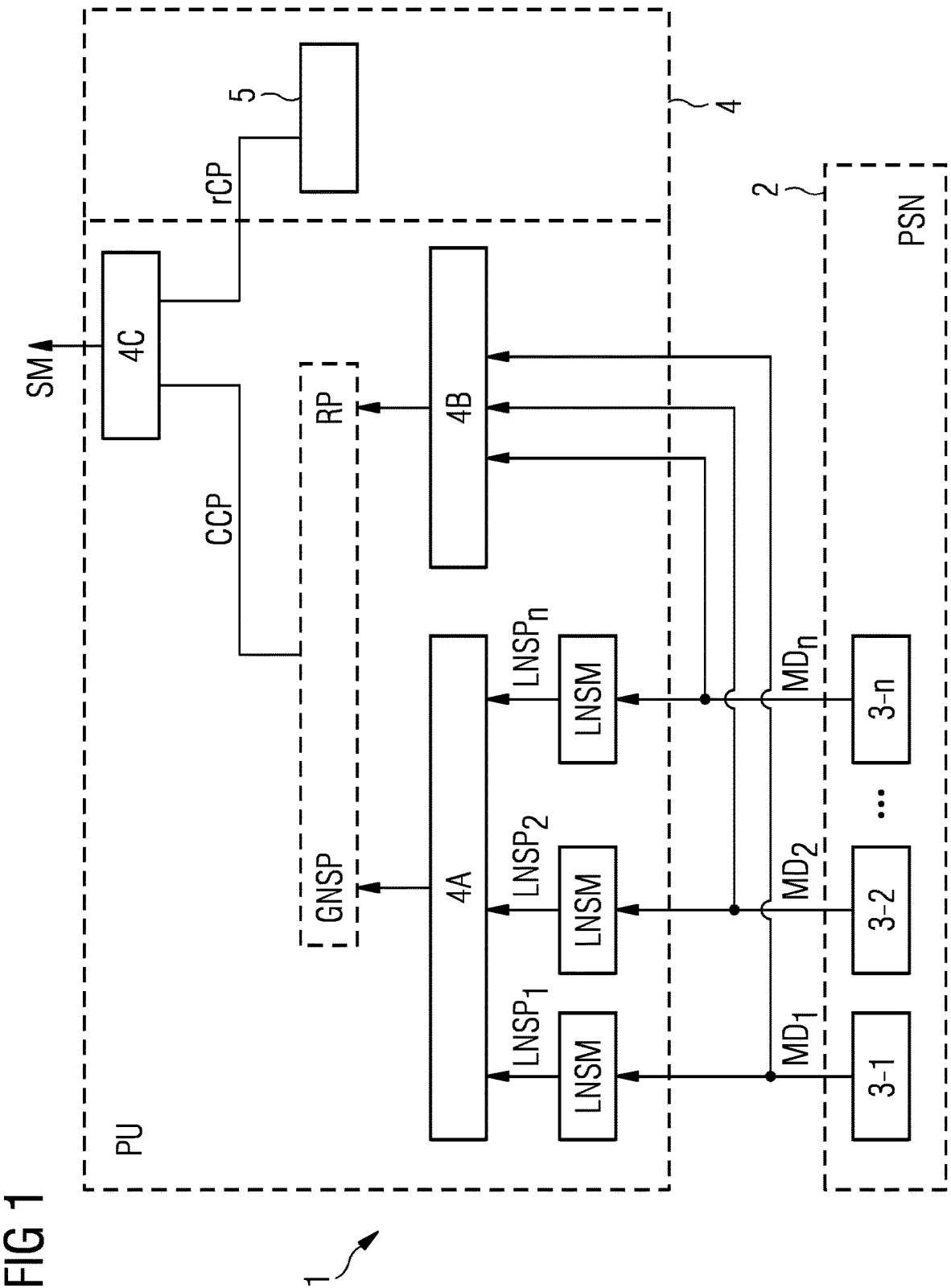
FIG. 1 shows a block diagram of a possible exemplary embodiment of a monitoring system for recognizing contingencies in a power supply network.

As shown in FIG. 1, a monitoring system 1 according to an aspect of the present embodiments is adapted in the illustrated embodiment to recognize contingencies in a power supply network 2. The power supply network 2 may be any kind of network supplying power to power consumption entities. In a possible embodiment, the power supply network 2 is formed by an electrical grid providing electrical power to consumption devices. The monitoring system 1 includes in the illustrated embodiment in-field measurement devices 3-1, 3-2 . . . 3-$n$ adapted to generate measurement data MD of the power supply network 2. In a possible embodiment, the in-field measurement devices 3-$i$ include different kinds of sensors adapted to generate different kinds of measurement data MD of the power supply network 2. In a possible embodiment, the in-field measurement devices 3-$i$ include phasor measurement units PMUs. The phasor measurement units PMUs measure electrical waves of the power supply network 2 (e.g., phase current phasors, phase voltage phasors) and corresponding frequency. In-field measurement devices 3-$i$ may include other sensor devices as well. For example, in-field measurement devices 3-$i$ may also include devices providing environmental data such as temperature or the like.

The monitoring system 1 includes, in the illustrated embodiment of FIG. 1, a processing unit 4 adapted to process the measurement data MD generated by the in-field measurement devices 3-$i$ of the power supply network 2 by associated neural attention models to provide a global network state profile GNSP of the power supply network 2 including, for the in-field measurement devices 3-$i$ of the power supply network 2, a class probability distribution over contingency classes. The processing unit 4 of the monitoring system 1 is further adapted to process the measurement data MD generated by the in-field measurement devices 3-$i$, of the power supply network 2 to provide a relevance profile RP of the power supply network 2 including, for the in-field measurement devices 3-I, a relevance distribution indicating a probability where the origin of a contingency within the power supply network 2 resides.

As shown in FIG. 1, the measurement data MD generated by the in-field measurement devices 3-$i$ of the power supply network 2 are processed by a local network state estimation model LNSM to calculate local network state profiles LNSP. A generation unit 4A of the processing unit 4 is adapted to generate a global network state profile GNSP from the local network state profiles LNSP as illustrated in FIG. 1.

The measurement data MD generated by the in-field measurement devices 3-$i$ of the power supply network 2 are further processed by a processor 4B of the processing unit 4 to provide a relevance profile RP as illustrated in FIG. 1. The relevance profile RP includes, for the in-field measurement devices 3-$i$, a relevance distribution indicating a probability where the origin of a contingency within the power supply network 2 resides.

As shown in FIG. 1, a candidate contingency profile CCP is formed by the generated global network state profile GNSP and by the calculated relevance profile RP.

The processing unit 4 of the monitoring system 1 further includes a computation unit 4C adapted to compute a similarity between the candidate contingency profile CCP and reference contingency profiles rCP stored in a reference contingency database 5 of the monitoring system 1 to identify the reference contingency profile rCP having the highest computed similarity as being the recognized contingency within the power supply network 2.

In a possible embodiment of the monitoring system 1 as illustrated in FIG. 1, the local network state profiles LNSPi each include a local contingency class probability profile including, for the different in-field measurement devices 3-$i$ of the power supply network 2, a class probability distribution over contingency classes. In an alternative embodiment, each local network state profile LNSP may also include a local latent contingency profile.

The in-field measurement devices 3-$i$ of the power supply network 2 may include phasor measurement units PMUs that provide time series of measurement data in different measurement channels c. The local network state estimation model LNSM may be formed, in a possible embodiment, by a neural attention model. The neural attention model may include, a convolutional layer to smooth measurement data MD received by associated in-field measurement devices 3-$i$. The neural attention model further may include, in a possible embodiment, at least one recurrent neural network (RNN) layer followed by a neural attention layer.

Each reference contingency profile rCP stored in the reference contingency database 5 may include, in a possible embodiment, a reference global network state profile rGNSP and a reference relevance profile rRP.

In a possible embodiment of the monitoring system 1 as illustrated in FIG. 1, a similarity metric SM indicating a similarity between the candidate contingency profile CCP and a reference contingency profile rCP is computed by the computation unit 4C for each reference contingency profile rCP stored in the reference contingency database 5 depending on the global network state profile GNSP of the candidate contingency profile CCP and depending on the global network state profile GNSP of the respective reference contingency profile rCP read from the database 5. The computed similarity metric SM may include, in a possible implementation, a weighted cosine similarity metric.

In a possible embodiment of the monitoring system 1, as shown in FIG. 1, for each reference contingency profile rCP stored in the reference contingency database 5, a first similarity metric SM1 and a second similarity metric SM2 is computed. The first similarity metric SM1 is calculated depending on the global network state profile GNSP of the candidate contingency profile CCP and depending on the global network state profile GNSP of the reference contingency profile rCP. The second similarity metric SM2 is computed depending on the relevance profile RP of the candidate contingency profile CCP and depending on the relevance profile RP of the reference contingency profile rCP. Further, a final similarity metric SM is then computed as a function of the calculated first similarity metric SM1 and the calculated second similarity metric SM2 by the computation unit 4C. The similarity metric SM indicating a similarity between the candidate contingency profile CCP and the reference contingency profile rCP is computed in this embodiment as a function of the calculated first similarity metric SM1 and the calculated second similarity metric SM2. In a possible specific embodiment, a similarity metric SM indicating a similarity between the candidate contingency profile CCP and a reference contingency profile rCP is computed by the computation unit 4C as an average of the first similarity metric SM1 and the second similarity metric SM2.

In a possible embodiment, the measurement data MD generated by each in-field measurement devices 3-$i$ of the power supply network 2 may be preprocessed to provide a standard deviation of the measurement data from an expected value in a steady state for each measurement channel of the respective in-field measurement device 3-$i$. Then, the preprocessed measurement data MD may be rescaled by dividing the preprocessed measurement data MD through the channel and in-field measurement device specific standard deviation. In a possible embodiment, a relevance weight is calculated for each in-field measurement device 3-$i$ by normalizing the standard deviation of the measurement data MD of the respective in-field measurement device 3-$i$ to provide the relevance profile RP. The local network state estimation models LNSM used by the processing unit 4 may be trained in a possible embodiment with measurement data of observed contingencies of the power supply network 2.

FIG. 2 shows a flowchart of a possible exemplary embodiment of a method for recognizing contingencies in a power supply network 2 according to a first aspect of the present embodiments. In the illustrated embodiment, the method includes a number of main acts.

In a first act S21, measurement data MD generated by in-field measurement devices 3-$i$ of the power supply network 2 is processed by a local network state estimation model LNSM to calculate local network state profiles LNSPi.

In a further act S22, the global network state profile GNSP is generated from the calculated local network state profiles LNSPi. This may be performed, for example, by a generation subunit 4A of the processing unit 4.

In a further act S23, the measurement data MD generated by the in-field measurement devices 3-$i$ of the power supply network 2 is processed to provide a relevance profile RP. This relevance profile RP includes, for the in-field measurement devices 3-$i$, a relevance distribution indicating a probability where the origin of a contingency within the power supply network 2 does reside. The generation of the global network state profile GNSP in act S22 and the generation of the relevance profile RP in act S23 may also be performed in parallel to save processing time in a possible embodiment.

In a further act S24, a similarity between a candidate contingency profile CCP and reference contingency profiles rCP is computed. The candidate contingency profile CCP is formed by the generated global network state profile GNSP and by the calculated relevance profile RP as also illustrated in FIG. 1. The reference contingency profiles rCP are stored in a reference contingency database 5 of the monitoring system 1. The similarity between the candidate contingency profile CCP and the reference contingency profiles rCP read from the reference contingency database 5 is computed to identify the reference contingency profile rCP having the highest computed similarity. The identified reference contingency profile rCP showing the highest computed similarity is recognized as the contingency having occurred in the power supply network 2.

The in-field measurement devices 3-$i$ of the monitoring system 1 as illustrated in FIG. 1 may measure data on different channels c. Each channel c may include a time series of specific data such as a current of a phase L in an electrical grid. In a possible embodiment, the measurement data may be preprocessed. The in-field measurement devices 3-$i$ may include phasor measurement units PMUs. Given a set of contingency observed in the power supply network 2 simulated by a proper simulation program such as SIGUARD DSA, one may observe phasors for current and phasors for voltage from each of the in-field PMU measurement devices 3-$i$ placed in the power supply network 2. First, symmetrical components and the active and reactive power from these signals may be computed. Further, for each PMU, a signal standard deviation may be estimated for each of the channels c. Further, signals may be rescaled by these values by dividing the signals through the channel and PMU specific standard deviation.

For example, if the power supply network 2 is monitored by 100 PMUs as in-field measurement devices 3-$i$, it is possible to measure 3-phase currents and 3-phase voltages. Accordingly, twelve sensor signals are retrieved for each PMU 3-$i$ (e.g., three times a voltage amplitude, three times a voltage angle, three times a current amplitude, and three times a current angle). This leads to 1200 sensor signals in total. From these sensor signals, it is possible to compute eight additional signals for each PMU coexisting of the symmetrical components of the current (e.g., three signals), the symmetrical components of the voltage (e.g., three signals), and active as well as reactive power, leading to 800 additional signals in total. Given these 800 signals, it is possible to compute 800 standard deviation values and to divide the 800 signals by the corresponding value.

For each contingency occurring in the power supply network 2, a snapshot of data is available reflecting the steady state of the power supply network 2 before the contingency has happened in the power supply network 2. This snapshot data may be used to compute a PMU-wise expected value or a mean value for each channel c and subtract these values from the measurement data MD. In this way, the subsequent calculation acts are only performed on deviations observed from the steady state. The local network state model LNSM or state estimator model may represent any kind of model that extracts some state representation (e.g., weighted state representation) from the incoming measurement data MD. In a possible embodiment, a machine learning ML based model may be used. The machine learning ML based model may include a tensor factorization model or an encoder part of an encoder-decoder neural network (e.g., an auto-encoder).

In a possible embodiment, the model is trained by providing the model with a set of observed contingencies preprocessed as described above. The measurement signals or measurement data MD are rescaled and only contain a deviation from an expected value of the steady state. Each set of measurements of a single PMU may be treated as a single training example. The training architecture of the model may include an encoder and decoder part. The encoder first projects the input sample onto a representation that is of lower dimensionality than the original input data.

After this act, the decoder part of the architecture is used to reconstruct the original data from this lower dimensional representation. During the training of such an approach, the model gets penalized for not reconstructing the input samples properly. As a consequence, the model may only reduce this penalty by compressing relevant information in the lower dimensional representation (e.g., the bottleneck) that describes enough features to successfully reconstruct the original signal. During training, the model learns a mapping from the input data to these features that satisfy this goal as best as possible. In a possible embodiment, a regularized square error loss may be used between the true measurements and the measurement reconstructed from the latent state representation by the decoder.

$$L(X,\theta) = (X - f_\theta(X))^2 + \lambda \|\theta\|_2^2,$$

where L is a loss function and θ are the free parameters of the model. $f_\theta$ is the encoder-decoder network for any other bottleneck architecture such as tensor factorization. The last summand of the above equation is a regularization term on the free parameters of the model that prevents overfitting during model training.

After training, it may be assumed that the features of the encoder do map the input data on represented important characteristics of the observed input signals. As an example, these features may represent abstract concepts such as "A sharp peak followed by a slow decay". However, in general, these features are not always interpretable. With the method according to the present embodiments, these methods are used as a representation of the local network state LNS captured by the individual in-field measurement device 3-$i$. These Features are computed by only applying the encoder part of the model on the input data as illustrated in FIG. 3.

FIG. 3 illustrates a local network state profile LNSP computed from data of a single in-field measurement device 3-$i$. In the illustrated example, there are nine different features F1 to F9 reflecting the local network state (LNS) of the power supply network 2 at the respective in-field measurement device 3-$i$. In the illustrated example of FIG. 3, feature F1 is prominent. The local network state profile LNSPi, as illustrated in the example of FIG. 3, may be supplied to the generation subunit 4A of the processing unit 4, as illustrated in FIG. 1, and used to generate the global network state profile GNSP.

Figure 4:
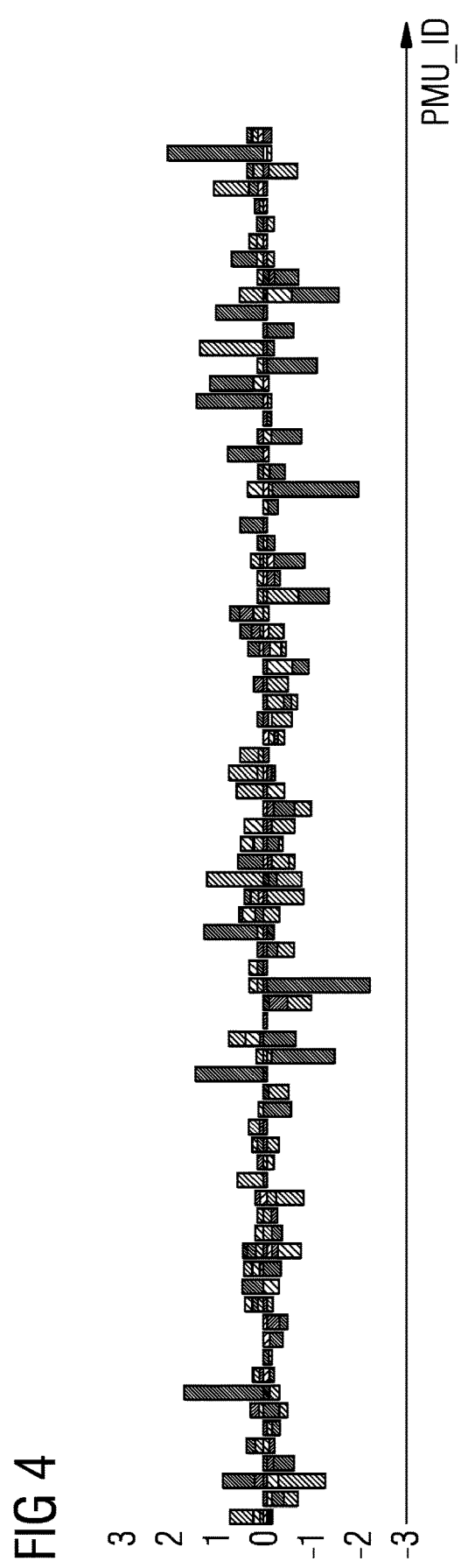
FIG. 4 illustrates a generated global network state profile used by a method and system for recognizing a contingency in a power supply network according to an embodiment.

FIG. 4 shows schematically an example of a global network state profile GNSP. The global network state profile GNSP includes the local network state profiles LNSPi from a plurality of in-field measurement devices 3-$i$. Each in-field measurement device 3-L such as a PMU, may include an associated measurement device ID. In a possible embodiment, the different local network state profiles LNSP may be concatenated to generate a global network state profile GNSP, as illustrated in FIG. 4. For a global network state estimation for an observed contingency happening in the power supply network 2, it is possible to apply a state estimator model on every in-field measurement device 3-$i$ independently. This provides a global profile of the global network state considering all estimated local network states. In the illustrated example of FIG. 4, each bar represents the value of the nth feature of the local network state LNS computed for each PMU in the observed contingency. The x-axis of the diagram of FIG. 4 represents the different PMU IDs of the different in-field measurement devices 3-$i$.

For example, the system may be trained with training data of 50 contingencies. For each contingency, measurement data MD may be provided from 100 PMUs (e.g., the PMUs are the in-field measurement devices that monitor the target power supply network). In this example, it is possible to extract 5000 examples or samples for the model training. If, for example, each contingency is measured for 12 time steps, a single input example may include 8×12=72 values. For example, it may be assumed that one wants to learn 10 features to describe a network state. In this specific example, the model is trained by passing the 5000 examples in small batches or as a whole to the model to learn the parameters of the encoder and decoder mapping functions to optimize the reconstruction target. In this model, the encoder may learn a function $h_1 = f_{enc}(X_i)$, where $X_i$ is the input data (e.g., 72 values) and $h_i$ is the estimated network state (e.g, 10 values). The decoder may learn a function $\tilde{X}_i = f_{dec}(h_i)$, where $\tilde{X}_1$ is the approximated input (e.g., the reconstruction).

In a possible embodiment, an importance weighting for each in-field measurement device 3-$i$ placed in the power supply network 2 is calculated based on the preprocessed data (e.g., the signals are rescaled and only contain the deviation from the expected value of the steady state).

$$q_p = \sqrt{\sum_c \sum_t (x_{pct} - \mu_{pc})^2}$$

$$w_p = \frac{q_p}{\sum_p q_p},$$

where $x_{pct}$ is the measured value of channel c of in-field PMU measurement device p at time step t, and $\mu_{pc}$ is the expected value of in-field measurement device PMU p and channel c. After computing the deviation values $q_p$ for all in-field measurement devices p, the deviation values are normalized providing a relative importance $w_p$ for each in-field measurement device 3-$i$. This act may be seen as computing a normalized Euclidean distance between the observed measurements and the expected values of the steady state.

Figure 5:
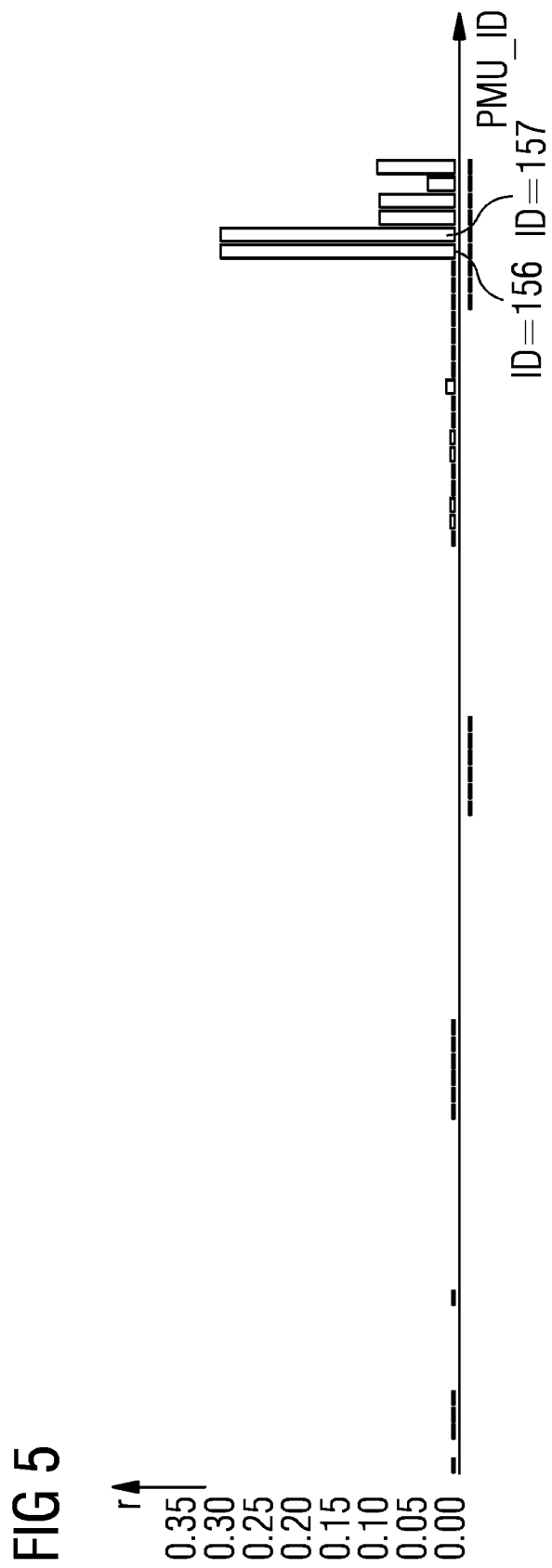
FIG. 5 shows a schematic diagram of an exemplary reference profile to illustrate the operation of a method and system for recognizing a contingency in a power supply network according to an embodiment.

FIG. 5 illustrates importance scores or relevance r for in-field measurement 3-$i$ devices given the data MD of an observed contingency. Each bar of the diagram represents an importance of an in-field measurement device 3-$i$ such as a PMU for the observed contingency. The x-axis represents the different IDs of the in-field measurement devices. In the illustrated specific example, the in-field measurement devices with the IDs 156, 157 are most prominent indicating the importance or relevance for the observed contingency.

In a possible embodiment, a weighted cosine similarity may be used as a metric for computing a similarity between profiles as follows:

$$\cos(u, v, \hat{w}) = \frac{\sum_i \hat{w}_i u_i v_i}{\sqrt{\sum_i \hat{w}_i u_i^2} \sqrt{\sum_i \hat{w}_i v_i^2}}$$

where u and v are the global network states of two contingencies j and k, and $\hat{w}$ is a weight vector that is computed from two PMU importance scores from each contingency by taking the maximum of each value:

$$\hat{w}_i = \max(w_{ji}, w_{ki})$$

After training the state estimator model, it is possible to build a reference database of a target contingency. It is possible to select the data of suitable target contingencies and construct a contingency profile for each of the target contingencies and store the constructed contingency profiles in a database.

For each newly detected contingency within the power supply network 2, the measurement data MD is recorded and a contingency profile is computed using the state estimator model and the steady state. This candidate contingency profile CCP may be compared to all contingency profiles CPs stored in the reference database 5 using, for example, the weighted cosine similarity metric as described above. The returned similarity computed by the computation unit 4C may be used to rank the contingency profiles with respect to similarity to the input candidate contingency profile CCP. The similarity values indicate how similar an observed contingency within the power supply network 2 is to the corresponding contingency profiles stored in the reference database 5.

Figure 6:
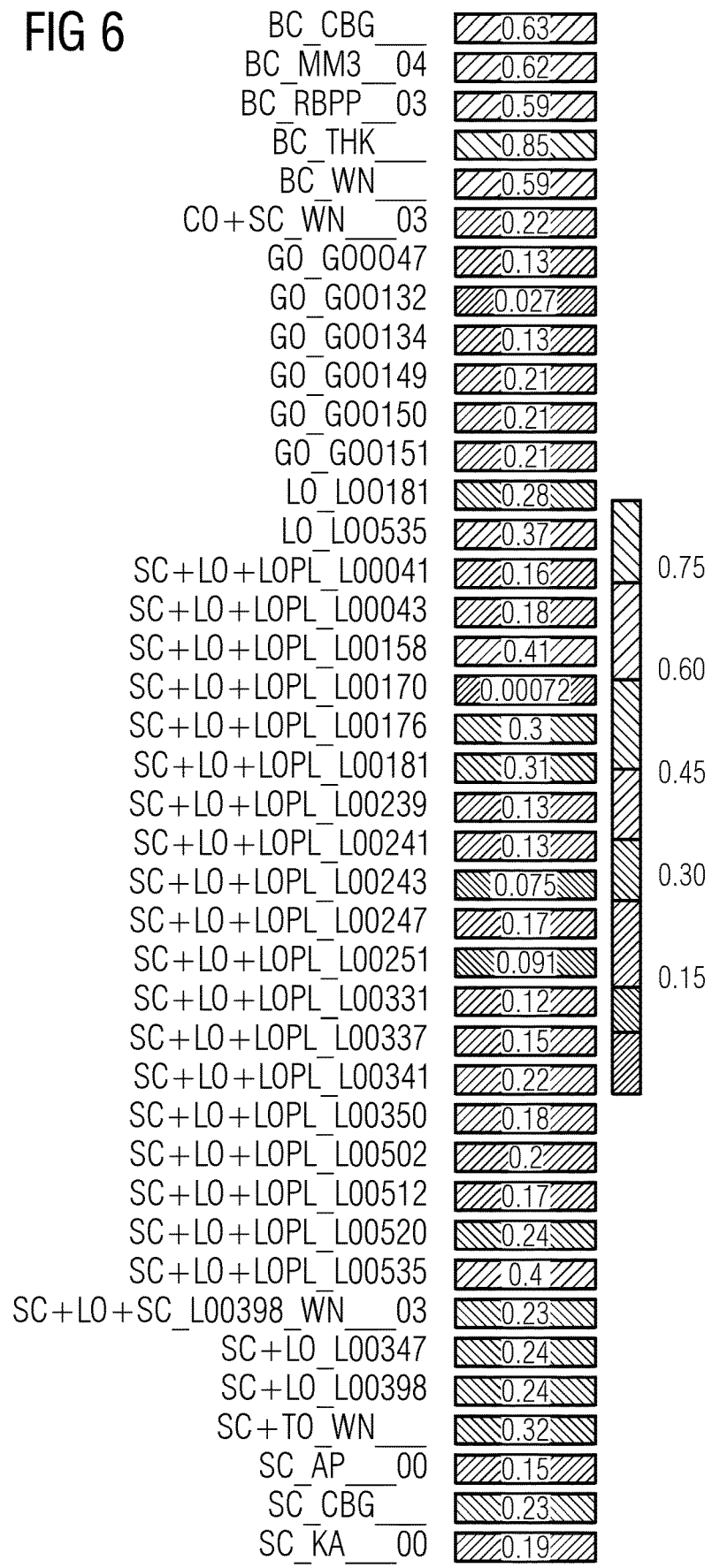
FIG. 6 shows schematically an example of a calculated final similarity of an observed contingency profile to reference contingency profiles stored in a reference contingency database.

FIG. 6 illustrates an example of a final similarity of an observed contingency to the contingencies stored in the reference database 5. Each field of FIG. 6 indicates how similar an observed contingency is to a corresponding contingency stored in the reference database 5. In FIG. 6, there are illustrated different contingency classes including, for example, short circuits SC, line outages LO, generator outages GO, or capacitor outages CO. With the method for recognizing contingency in a power supply network 2 according to the first aspect of the present embodiments, it is possible to recognize a contingency in a power supply network 2 automatically and near real time with high reliability.

A model is learned for observations of single in-field measurement devices deriving a local network state representation that reflects an observation at the respective in-field measurement device 3-*i*. In-field measurement devices 3-*i* (e.g., PMUs) that are removed from the monitored power supply network 2 do not require a retraining of the state estimator model. If an in-field measurement device is removed from the power supply network 2, a local state representation for this removed in-field measurement device is not computed, and the local state representations for the reference contingencies are removed from the reference database 5. Similarly, outages of in-field measurement devices 3-*i* may be naturally treated by ignoring the local state representation for these in-field measurement devices 3-*i*. In this case, the local state representation of the in-field measurement device may be ignored in the reference contingencies when computing the similarities.

Since a general model is learned for local state representations observed by in-field measurement devices, it is possible to add and relocate in-field measurement devices at will without the need to retrain the model from scratch. All changes only influence the reference database 5 for which the state estimator model LNSM is applied on the new contingency data MD.

The system is flexible in the number of in-field measurement devices 3-*i* and associated local state representations LNSPs. It is possible to consider older contingencies with deviating number of in-field measurement devices 3-*i* when searching for a similar contingency in the reference database 5. This is of special importance if the reference database 5 is filled with real contingencies instead of simulated contingencies.

After having learned a general model that extracts local state representations from in-field measurement devices 3-*i*, the approach according to the present embodiments may be even power network independent, applying the same trained model on various different power supply networks. Knowledge about the expected located of an observed contingency is considered explicitly by the method and system according to the present embodiments when computing the similarity between two contingencies. This is important in scenarios where large power supply networks PSNs are monitored. In this scenario, effects of a contingency that may be observed by the in-field measurement devices 3-*i* may be very local, providing that only a small portion of the placed in-field measurement devices 3-*i* will measure any kind of effects caused by the contingency. When comparing two contingencies, only the local state representations LNSPs of the in-field measurement devices that characterize the observed contingency are considered. The local state representations of the remaining other in-field measurement devices do not contain any relevant information or measurement data MD and may consequently be ignored.

After having recognized a contingency, a control unit of a system may trigger countermeasures. Further, the recognized contingency may be output to a user via a graphical user interface of the monitoring system 1. After having initiated the countermeasures, it may be observed whether the recognized contingency has been removed.

FIG. 1 shows a possible exemplary embodiment of a monitoring system 1 according to an aspect of the present embodiments. The processing unit 4 of the monitoring system 1 may be implemented on a controller of the power supply network 2. Further, subunits of the processing unit 4 may also be implemented on distributed components connected to measurement devices 3-*i* of the power supply network 2. In a possible embodiment, the computation unit 4C of the processing unit 4 may output a reference contingency having the highest similarity with the observed contingency. In a possible embodiment, a control unit of the system 1 may automatically generate control signals CRTL depending on the recognized contingency to perform countermeasures to remove the recognized contingency in the power supply network 2. This control unit may provide control signals to control actuators within the power supply network 2 (e.g., switching devices). For example, in response to a recognized contingency, switches may be triggered to switch off subsystems or components of the power supply network 2. Further, components or subsystems may be switched on to replace affected components of the power supply network 2. After having performed the switching, it may, in a further act, be evaluated whether the recognized contingency has been removed in the power supply network 2. The recognition of the contingency in the power supply network as well as the performance of the countermeasures may be performed automatically in real time.

Figure 7:
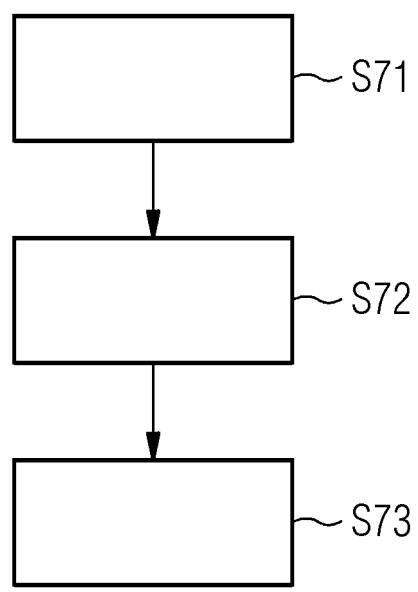
FIG. 7 shows a flowchart of a possible exemplary embodiment of a method for recognizing contingencies in a power supply network according to a further aspect of the present embodiments.

FIG. 7 shows a flowchart of a possible exemplary embodiment of the method for recognizing a contingency in a power supply network 2 according to a further aspect of the present embodiments. In the illustrated embodiment of FIG. 7, the method for recognizing contingencies in the power supply network 2 includes three main acts.

In a first act S71, measurement data MD generated by in-field measurement devices 3-*i* of the power supply network 2 are processed by associated neural attention models to provide a global network state profile GNSP of the power supply network 2 including, for the in-field measurement devices 3-*i* of the power supply network 2 a class probability distribution over contingency classes.

In a further act S72, measurement data MD generated by the in-field measurement devices 3 of the power supply network 2 are processed to provide a relevance profile RP of the power supply network 2 including, for the in-field measurement devices 3-I, a relevance distribution indicating a probability where the origin of the contingency within the power supply network 2 resides.

In a possible embodiment, act S71 and act S72 may be performed in parallel to reduce the required computation time for recognizing a contingency in the power supply network 2.

In a further act S73, the calculated global network state profile GNSP of the power supply network 2 and the calculated relevance profile RP of the power supply network 2 are compared with reference contingency profiles rCP stored in a reference contingency database 5 to recognize a contingency in the power supply network 2.

Each neural attention model associated with a corresponding in-field measurement device 3 may be used to calculate a local network state profile LNSP for the power supply network 2 at the respective in-field measurement device 3. In a possible embodiment, the local network state profiles LNSP of the different in-field measurement devices 3 are concatenated to provide the global network state profile GNSP of the power supply network 2.

The neural attention model LNSM includes, in a possible embodiment, a convolutional layer CONL to smooth measurement data MD received by associated in-field measurement devices 3 of the power supply network 2. The neural attention model LNSM associated with a corresponding in-field measurement device 3 of the power supply network 2 includes at least one recurrent neural network (RNN) layer to capture a time-dependency of the received measurement data MD. The neural attention model associated with an in-field measurement device 3 of the power supply network 2 includes, in a possible embodiment, an attention layer that weights outputs of the last recurrent neural network (RNN) layer of the neural attention model with the output of an associated feed-forward attention subnetwork receiving channel-wise context information data indicating a steady state of the power supply network 2 at the respective in-field measurement device 3.

Figure 8:
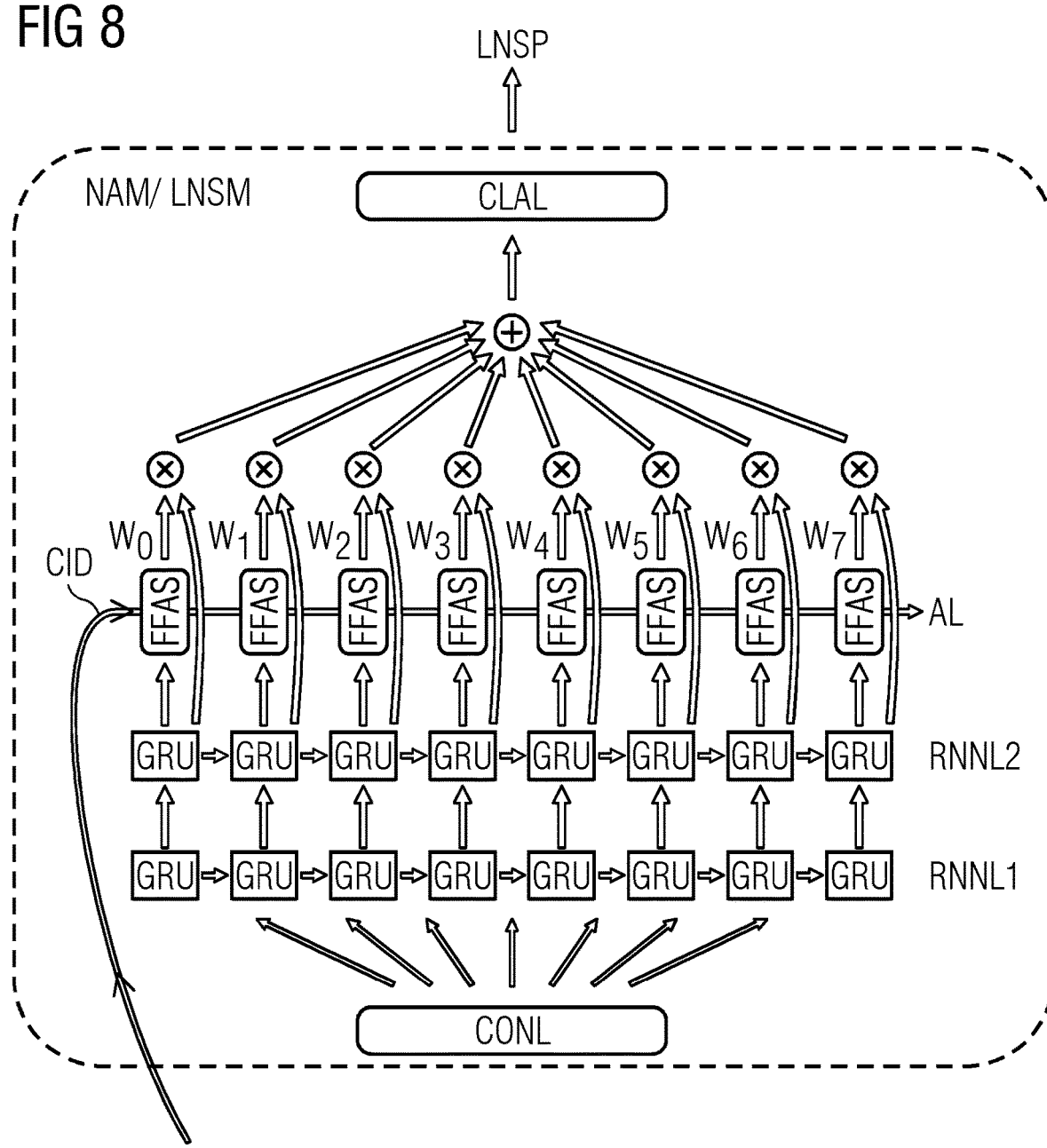
FIGS. 8 and 9 show a schematic diagram illustrating a possible exemplary embodiment of a neural attention model as used by a monitoring system according to an aspect of the present embodiments.

FIG. 8 shows schematically a neural attention model NAM that may be used by the method and system according to the present embodiments. The neural attention model of FIG. 8 may form a local network state model LNSM as illustrated in FIG. 1.

As illustrated in the embodiment of FIG. 8, the neural attention model includes a convolutional layer CONL adapted to smooth measurement data received by an associated in-field measurement device 3-$i$ of the power supply network 2. This convolutional layer CONL forms a component to increase noise robustness.

The neural attention model further includes, in the illustrated embodiment, two recurrent neural networks (RNN) layers that are adapted to capture a time-dependency of the received measurement data MD. Each recurrent neural network layer RNNL includes gated recurrent units GRUs as illustrated in FIG. 8.

The neural attention model LNSM further includes, in the illustrated embodiment, a classification layer CLAL adapted to weight the received outputs of the last recurrent neural network layer RNNL2 of the neural attention network to calculate a local network state profile LNSP for the power supply network 2 at the respective in-field measurement device 3 indicating a predicted class probability distribution over contingency classes. In the illustrated example of FIG. 8, the neural attention model LNSM associated with an in-field measurement device 3 of the power supply network 2 includes an attention layer AL that weights ($w_0$-$w_7$) outputs of the last recurrent neural network layer RNNL2 of the neural attention model with the output of an associated feed-forward attention subnetwork FFAS receiving generalized context information data CID indicating a steady state SS of the power supply network 2 at the respective in-field measurement device 3. The neural attention model LNSM associated with the corresponding in-field measurement device 3 includes the classification layer CLAL that receives the weighted outputs of the last recurrent neural network layer RNNL2 of the neural attention network to calculate a local network state profile LNSD for the power supply network 3 at the respective in-field measurement device 3 indicating a predicted class probability distribution over contingency classes.

Each reference contingency profile rCP stored in the reference contingency database 5 includes a reference global network state profile rGNSP and a reference relevance profile rRP. A similarity metric SM indicating a similarity between a candidate contingency profile CCP formed by the global network state profile GNSP and the relevance profile RP of the power supply network 2 and a reference contingency profile rCP is computed for each reference contingency profile rCP stored in the reference contingency database 5 depending on the global network state profile GNSP of the candidate contingency profile CCP and depending on the global network state profile GNSP of the respective reference contingency profile rCP. The used similarity metric SM may include, for example, a weighted cosine similarity metric SM.

In the monitoring system 1 according to the present embodiments, a profile is computed for the observed contingency data where the profile consists of two main components. The first component of this computed profile (e.g., candidate contingency profile CCP) is a global network state profile GNSP indicating what kinds of contingencies are observed in the power supply network 2 (e.g., the global network state profile GNSP may be regarded as a "what pattern" indicating what kind of contingencies are observed in the power supply network 2). The second component of the candidate contingency profile CCP is indicating which in-field measurement devices 3 are considered most relevant or important and may be seen as an indicator where the origin of the contingency in the power supply network 3 resides. Accordingly, the reference profile RP may be seen as a "where pattern" indicating where the observed contingency has occurred. The combination of the "what pattern" (e.g., global network state profile GNSP) and the "where pattern" (e.g., relevance profile RP) provides a clear and specific individual profile of a contingency in the power supply network 2 that may be automatically recognized given a set of reference contingency profiles rCP stored in a database 5.

Figure 9:
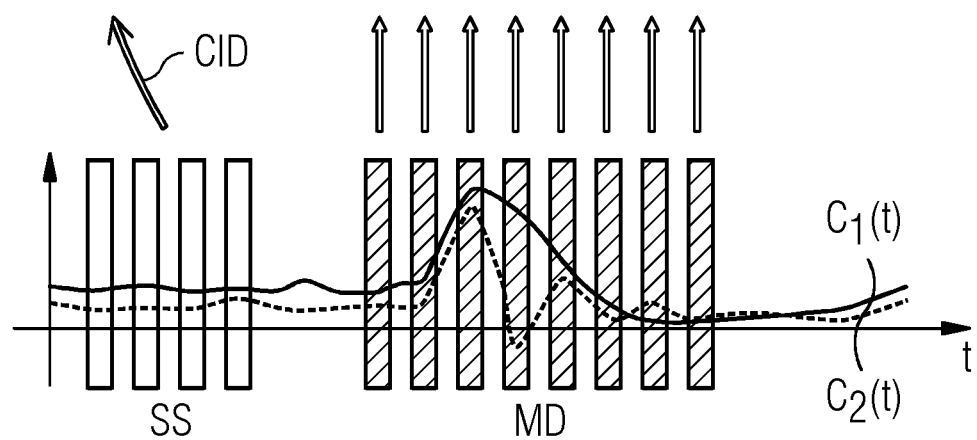

A possible embodiment of a neural attention model LNSM is illustrated in FIG. 8. The neural attention model LNSM includes various subcomponents that increase the robustness of the model toward expected disturbances such as noise, time-dependencies, and fuzzy anomaly detection that may have an impact on the contingency recognition quality. In addition, the neural attention model LNSM produces interpretable local state representations that encode a probability distribution over contingency classes such as short circuit SC, line loss LL, generator outage GO, etc. This provides a better intuition about recognition of a target contingency. For achieving high noise robustness, a channel-wise convolution is performed with a single filter on a time axis of the input measurement data MD of a single in-field measurement device 3. Accordingly, the neural attention model LNSM includes, as an input, a convolutional layer CONL receiving the contingency signal or measurement data MD from the in-field measurement device 3 as illustrated in FIG. 9.

$$h_t^0 = \sum_i^s w_i X_{1+i} \quad (1)$$

where X contains the preprocessed measurements of a single in-field measurement device. X is of shape channels x time and w is the filter vector of the shape s×s. The interpretation of the convolutional layer CONL is that of a basic moving window signal smoothing operator. Signal smoothing is used for counteracting noise in signals. In contrast to conventional fixed smoothing kernels, the applied smoothing may also be learned by the model autonomously.

The dependencies across time in the data are directly considered by using recurrent neural network layers RNNLs as illustrated in FIG. 8. In the illustrated embodiment, two recurrent neural network layers RNNL1, RNNL2 are stacked on top of the output of the convolutional layer CONL. Each recurrent neural network layer includes gated recurrent units GRUs.

$$z_t^1 = \sigma(W_z^1 h_t^0 + U_z^1 h_{t-1}^1 + b_z^1)$$

$$r_t^1 = (W_r^1 h_t^0 + U_r^1 h_{t-1}^1 + b_r^1)$$

$$h_t^1 = (1-z_t^1) \circ \sigma_h(W_h^1 h_t^0 + U_h^1(r_t^1 \circ h_{t-1}^1) + b_h^1) + z_t^1 \circ h_{t-1}^1$$

$$z_t^2 = \sigma(W_z^2 h_t^1 + U_z^2 h_{t-1}^2 + b_z^2)$$

$$r_t^2 = (W_r^2 h_t^1 + U_r^2 h_{t-1}^2 + b_r^2)$$

$$h_t^2 = (1-z_t^2) \circ \sigma_h(W_h^2 h_t^1 + U_h^2(r_t^2 \circ h_{t-1}^2) + b_h^2) + z_t^2 \circ h_{t-1}^2$$

The superscript indicates the layer index. The formulas above correspond to a standard GRU formulation.

The neural attention model LNSM illustrated in FIG. 8 further includes an attention mechanism that weights the importance of the outputs of the last recurrent neural network layer RNNL2.

$$h^3 = \sum_t^T f_{att}(h_t^2, C) \cdot h_t^2$$

with $$f_{att}(h, C) = \varphi(W_{att}^1 \varphi(W_{att}^0 [h; C] + b_{att}^0) + b_{att}^1)$$

For this, each output of the last recurrent neural layer RNNL2 is combined with context information $C_p$. Context information in the illustrated embodiment is formed by the steady state; (SS) signal provided by the respective in-field measurement device 3 indicating a normal operation state of the power supply network 2 at the location of the in-field measurement device 3. The steady state signal SS of an in-field measurement device 3 forms context information data CID that may be stored locally in a buffer and may be read from the buffer in case that a contingency is observed providing a contingency signal MD. This context information CID may be applied to the attention subnetworks FFAS as shown in FIG. 8. The context information data CID may be supplied channel-wise. In the illustrated example of FIG. 9, the signal diagram has two channels c1, c2.

The output of the attention subnetwork FFAS $f_{att}(h,C)$ is a single weight w that is multiplied with the output of the corresponding output from the last recurrent neural network layer RNNL2 as shown in FIG. 8. The sum of the weighted outputs is computed to produce a single output vector ($h^3$). The intuition behind this mechanism is as follows. Assuming that the anomaly detection triggers too early and, for example, half of the time window given to the model does not contain any anomalous data, then it is desired that the algorithm does ignore the first half of the received data automatically and does focus on that part of the received data that includes the important information. The model does learn the behaviour automatically from data to be able to decide autonomously when applied on new incoming measurement data MD. This is what the attention mechanism AL after the last recurrent neural network layer RNNL2 is performing. Given some context (e.g., steady state), CID, and what the model knows so far (e.g., the output of the recurrent neural network layer RNNL2), the model may reevaluate and weight the importance of the output at time step t before performing a final classification using the classification layer CLAL.

The contingency class may be predicted by:

$$\hat{y} = \phi(W^4 h^3 + b^3) \text{ with } \phi(x)_c = \frac{e^{x_c}}{\sum_c e^{x_c}}$$

The classification layer CLAL provides a predicted probability for each contingency class. This may be used as a local network state profile LNSP.

The neural attention model LNSM as illustrated in FIG. 8 may be learned end-to-end, providing that all components are learned at once. For training of the neural attention model, it is possible to use a complete set of measurements of a single in-field measurement device 3 as one training example that may be labelled with the class of a contingency. For example, considering a power supply network 2 monitored by 100 in-field measurement devices 3, a contingency Short Circuit Line may result in 100 examples or example datasets, where each dataset may be labelled with Short Circuit SC. In addition, one may perform random crops during training on the examples (e.g., on the time axis) extracting fixed length windows that may, for example, span about 0.5 seconds from the interval [−0.25; 0.75], where −0.25 points to time steps that lie up to 0.25 seconds before the actual contingency has happened in the power supply network 2. For each training example or dataset, one may perform two random crops, where it is enforced that the representations produced for the classification layer CLAL are of high similarity. This may be accomplished by minimizing an additive cost function that penalizes the combination of representation dissimilarity and classification error of both crops.

$$L(X, y, \theta) = -\sum_i y_i \log(f_\theta(X_{i,1})) - y_i \log(f_\theta(X_{i,2})) + \beta \cdot f_{sim}(g_\theta(X_{i,1}), g_\theta(X_{i,2}))$$

where $f_\theta$ is the neural attention model LNSM parameterized by $\theta$, and y is the label of example dataset i.

$X_{i,1}, X_{i,2}$ are the cropped examples, and $f_{sim}$ is a similarity function between the representations computed from the cropped examples by the neural attention model LNSM without applying the classification layer CLAL ($h^4$). Further, $g_\theta$ is the function of the sub neural network that computes these representations. Further, $\beta$ is a scalar that weights the impact of the similarity condition. The cost function may be minimized with stochastic gradient descent using, for example, the ADAM step rule.

The neural attention model LNSM as illustrated in FIG. 8 predicts for the measurement data MD of each individual in-field measurement device 3 a distribution over contingency classes defining as such (e.g., short circuits SC, line outages LO, or generator outages GO) to give come exemplary contingency classes. In contrast to conventional approaches (e.g., tensor factorization), these contingency classes provide interpretable meaning. Further, it is possible to include a specific class for "Nothing happened," which allows to react properly on false alarms.

Figure 10:
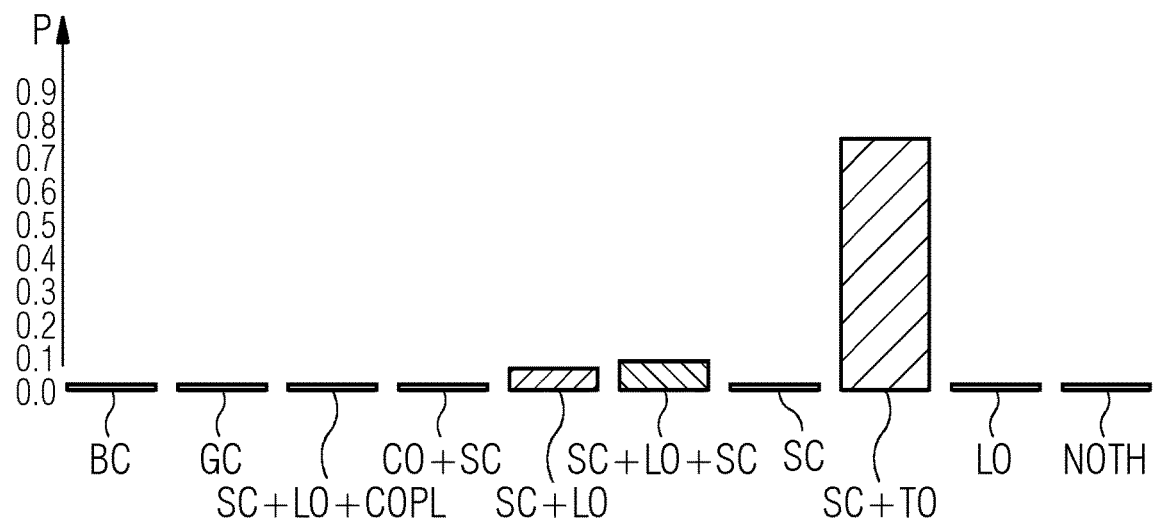
FIG. 10 shows a schematic diagram for illustrating a soft classification with confidences for a single in-field measurement device for illustrating the operation of a method and apparatus according to the present embodiments.

FIG. 10 shows a soft classification with confidences or probability values P for a single in-field measurement device 3 within the power supply network 2. The diagram of FIG. 10 illustrates the probability P for different contingency classes such as Bus Bar Trip (BC) or General Outage (GO). In the illustrated example, the contingency class SC+TO is most prominent and includes the highest probability P. FIG. 10 is a local network state profile (LNSP) illustrating a local network state LNS within the power supply network 2 at the location of the respective in-field measurement device 3.

Figure 11:
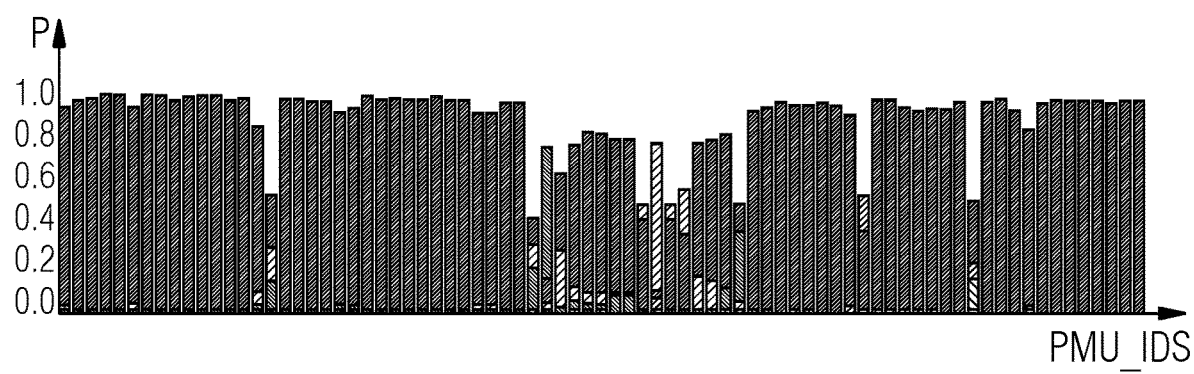
FIG. 11 shows a further schematic diagram for illustrating a soft classification with confidences for in-field measurement devices for illustrating the operation of a method and system for recognizing contingencies in a power supply network according to an aspect of the present embodiments.

In a possible embodiment, a global representation of the network state may be formed by concatenation of all local network state profiles LNSPs as illustrated in FIG. 10. A global network state profile GNSP that may be used by the system is illustrated in FIG. 11. FIG. 11 shows a diagram illustrating a soft classification with confidences for each in-field measurement device 3. Each bar represents a class distribution of a single in-field measurement device 3 as shown in FIG. 10.

In a possible embodiment, an importance weighting for each in-field measurement device 3 placed in the power supply network 2 may be computed in parallel based on the preprocessed data (e.g., the signals received from the in-field measurement devices 3 that have been rescaled and only contain the deviation from an expected value of the steady state SS).

FIG. 5 illustrates a diagram for illustrating an importance or relevance r of different in-field measurement devices 3 for an observed contingency. After having trained a state estimator model, it is possible to build a reference database of target contingencies to be detected in a power supply network 2. To achieve this, it is possible to select the data of suitable target contingencies and construct a contingency profile for each of the target contingencies and store the constructed contingency profiles in a contingency database.

The contingency profiles may be compared in three subacts.

First, a cosine similarity between the "what pattern" (e.g., global network state profile (GNSP)) and the "what pattern" of the target contingency stored in the database 5 is computed as follows:

$$\cos(u, v) = \frac{\sum_i u_i v_i}{\sqrt{\sum_i u_i^2} \sqrt{\sum_i v_i^2}}$$

Further, a cosine similarity between the "where pattern" of the reference contingency and the "where pattern" of the target contingency is computed as follows:

$$\cos(h, k) = \frac{\sum_i h_i k_i}{\sqrt{\sum_i h_i^2} \sqrt{\sum_i k_i^2}}$$

In the last subact, these two similarity scores may be combined. This may be performed, for example, by taking the mean of both values to get the similarity between the reference contingency and the target contingency:

$$sim(r, t) = \frac{\cos(u, v) + \cos(h, k)}{2}$$

Figure 12:
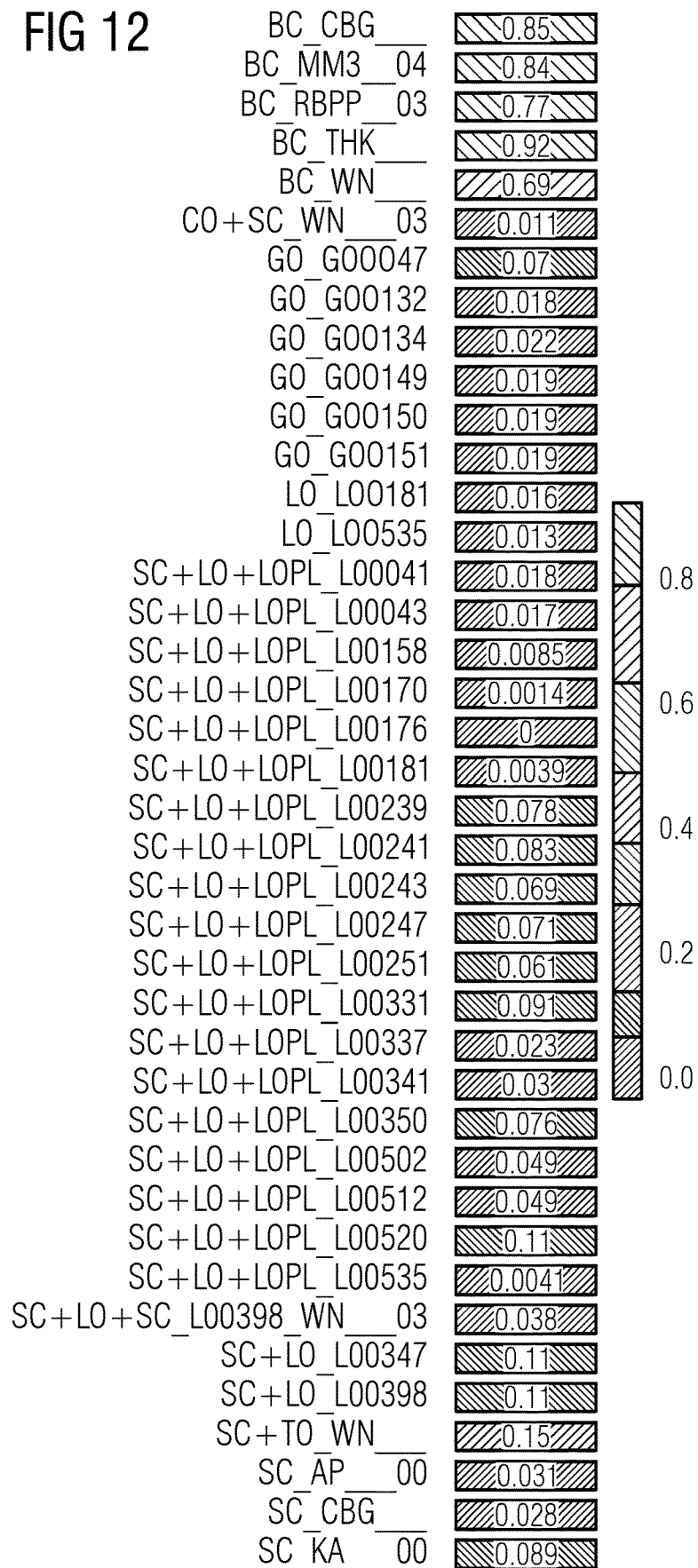
FIGS. 12 and 13 illustrate a similarity comparison of target soft classification patterns against soft classification patterns of known reference contingencies.
Figure 13:
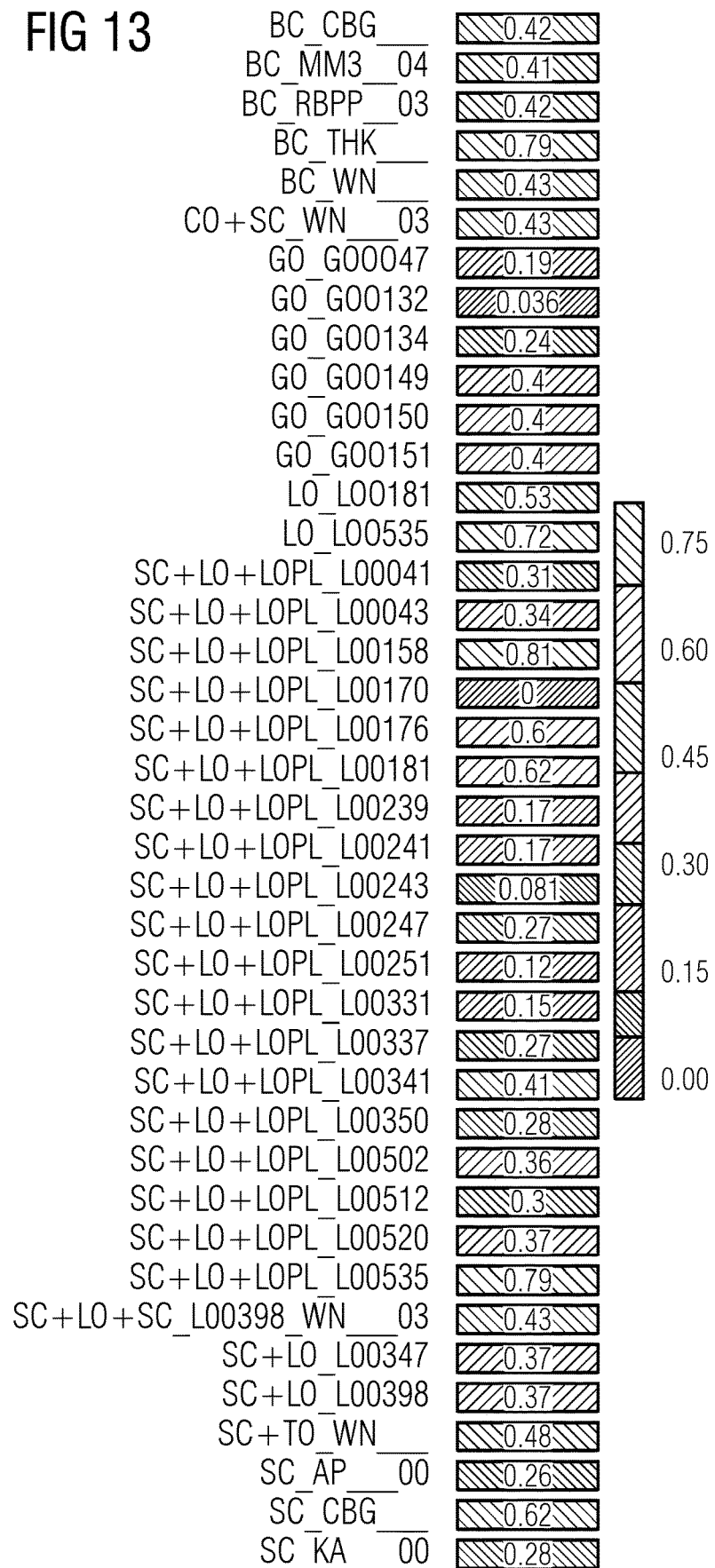
Figure 14:
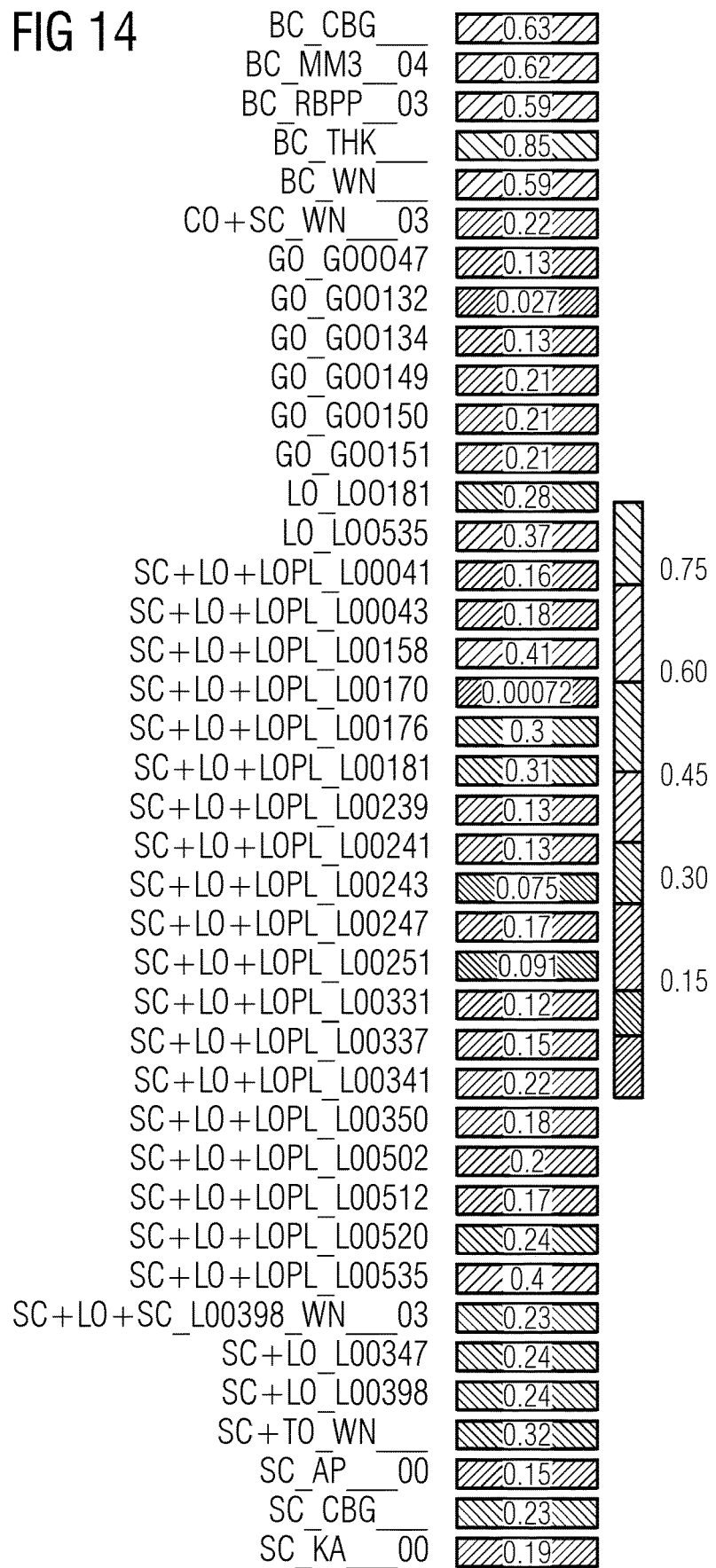
FIG. 14 shows a schematic diagram showing a final similarity of input contingency data to known reference contingencies by combining similarities from a soft classification pattern with similarities of a location pattern.
Figure 15:
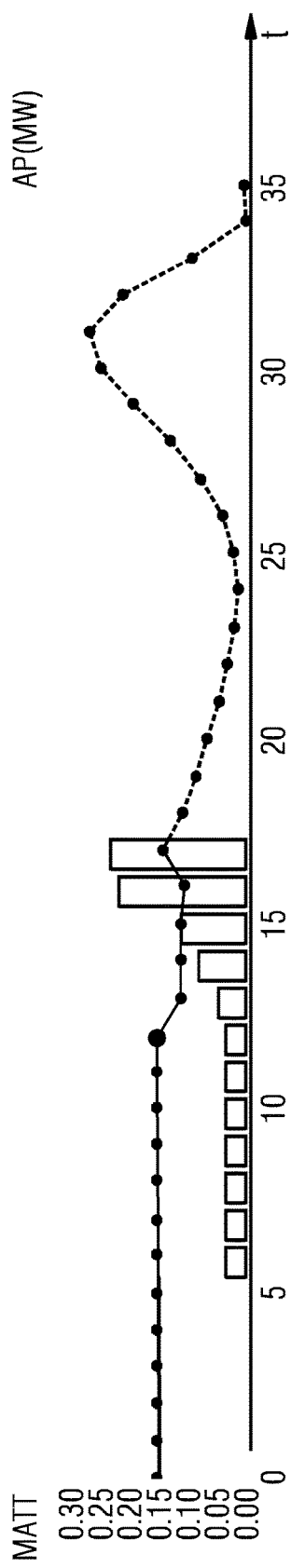
FIG. 15-19 show an attention mechanism of a neural attention model as illustrated in FIG. 8.
Figure 16:
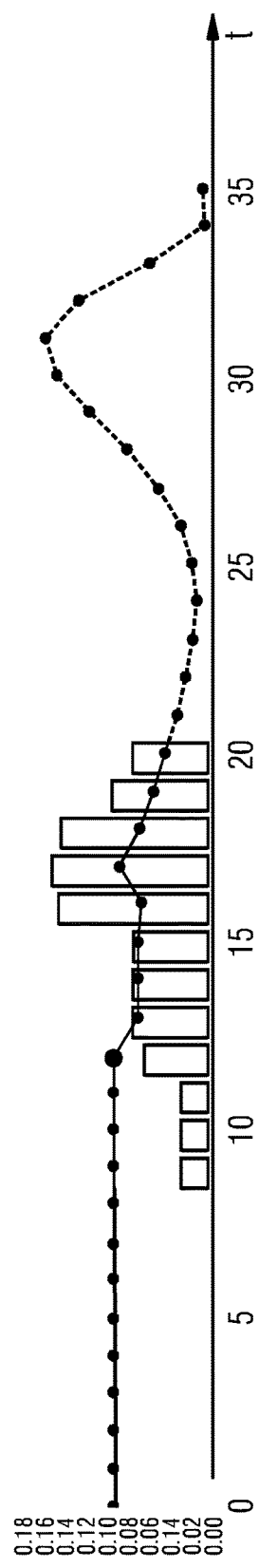

An example of this approach is shown in FIGS. 12, 13 (subact 1 and subact 2) and in FIG. 14 (subact 3).

FIG. 12 illustrates a similarity comparison of a target soft classification pattern ("what pattern") against soft classification pattern of known reference contingencies.

FIG. 13 illustrates a similarity comparison of a target location pattern ("where pattern") against location pattern of known reference contingencies.

Further, FIG. 14 illustrates a final similarity of input contingency data to known contingencies by combining the similarities from the soft classification pattern with the similarities of the location pattern. In the illustrated specific example, the recognized contingency of the power supply network is BC_THK having a similarity score of 0.85.

In the method and system according to the present embodiments, for each newly detected contingency, the measurement data MD may be recorded and a corresponding contingency profile may be computed using a state estimator model and a steady state. This profile may be compared to all profiles in a reference database using, for example, a cosine similarity-based similarity metric SM as described above. The returned similarity may be used to rank the candidate contingencies with respect to similarity to the input contingency profile. The similarity values indicate how similar an observed contingency is to the corresponding contingency stored in the reference database 5.

An aspect of the present embodiments lies in improving the network state representation (e.g., "what pattern") and making the network state representation more robust to variations in the input data. This may be accomplished by two features of the present embodiments. The generation of interpretable local pattern (e.g., distribution of contingency classes) that describes the local belief of an in-field measurement device 3 what contingency has happened and the neural attention mechanism.

Figure 17:
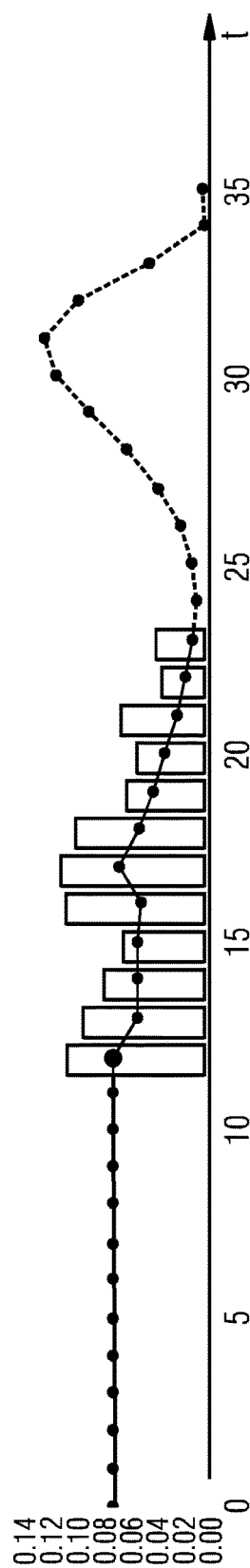
Figure 18:
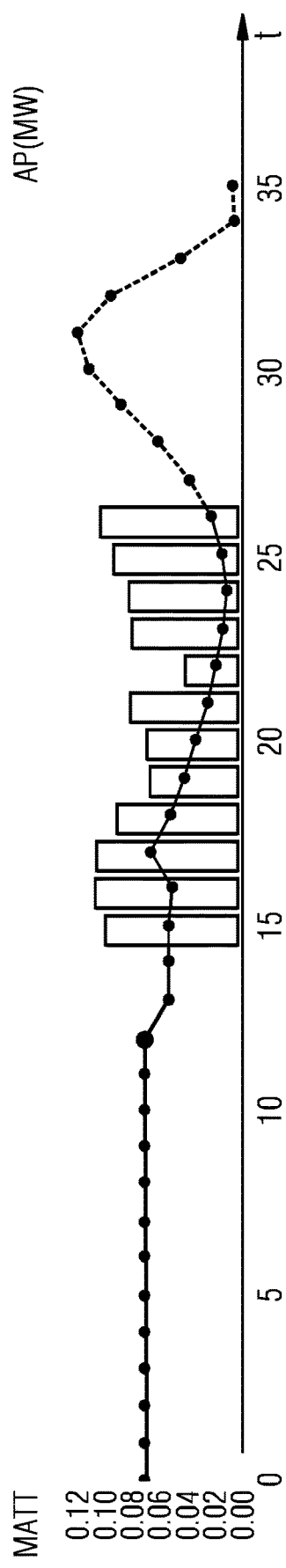
Figure 19:
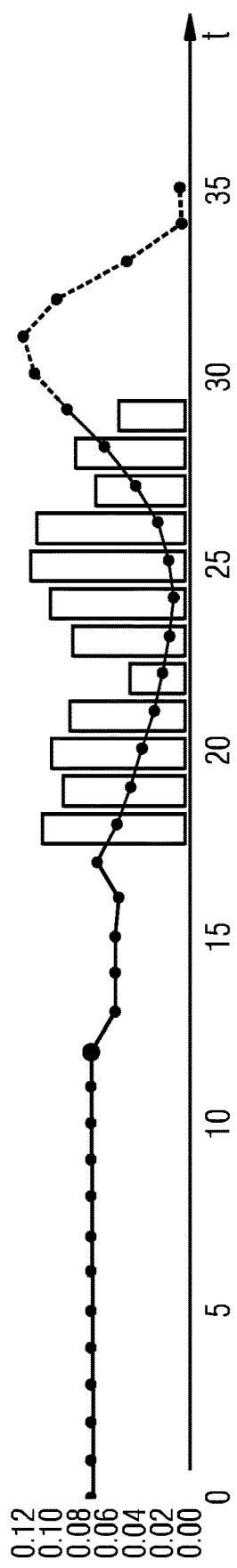

FIGS. 15-19 illustrate an attention mechanism of the neural attention model LNSM as shown in FIG. 8. The attention mechanism (e.g., model attention MATT) is demonstrated with actual data simulated for an electrical grid 2 that mimics a real electrical grid. For better visualization, only a raw active power AP signal is illustrated. The model is actually applied on an artificially noised variant of this signal. The five images of FIGS. 15-19 show the behaviour of the attention mechanism for five different scenarios where it is assumed that the anomaly detection algorithm may fail to determine the correct start of the anomaly (e.g., indicated by a dot) except for the third case as shown in FIG. 17. The first part of the curve is the part of the signal the neural attention model is fed with. For example, in the first image of FIG. 15, it is assumed that the anomaly detection determines the start of the anomaly or contingency six time steps too early. In the last image (see FIG. 19), the anomaly detection determines the anomaly six time steps too late. It is shown that the attention of the model (e.g., shown by bars) is highly dynamic, indicating that the model is aware of the varying information content of the fed data. This is shown in the first two images (see FIGS. 15 and 16), where the data that does not belong to the actual contingency is given a low attention since the data does not contain any information that does characterize the subsequent contingency. Due to this dynamic awareness, the model has a much higher tolerance to variations in the input data, leading to a superior robustness compared to conventional methods.

The elements and features recited in the appended claims may be combined in different ways to produce new claims that likewise fall within the scope of the present inventon. Thus, whereas the dependent claims appended below depend from only a single independent or dependent claim, it is to be understood that these dependent claims may, alertnatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for recognizing contingencies in a power supply network, the method comprising:
   processing measurement data generated by in-field measurement devices of the power supply network by associated neural attention models, such that a global network state profile of the power supply network is provided, the global network state profile comprising for the in-field measurement devices of the power supply network, a class probability distribution over contingency classes;
   processing the measurement data generated by the in-field measurement devices of the power supply network, such that a relevance profile of the power supply network is provided, the relevance profile comprising for the in-field measurement devices a relevance distribution indicating a probability where an origin of a contingency within the power supply network resides;
   forming a candidate contingency profile by the global network state profile and the relevance profile of the power supply network;
   comparing the candidate contingency profile with reference contingency profiles stored in a reference contingency database, such that contingencies in the power supply network are recognized; and
   computing a final similarity metric indicating a similarity between the candidate contingency profile and a reference contingency profile for each of the reference contingency profiles stored in the reference contingency database, wherein the contingency is recognized based on the computed final similarity metric and one or more countermeasures are performed to remove the recognized contingency.

2. The method according to claim 1, wherein each of the neural attention models associated with a corresponding in-field measurement device is used to calculate a local network state profile for the power supply network at the respective in-field measurement device.

3. The method of claim 2, wherein the local network state profiles of the different in-field measurement devices are concatenated to provide the global network state profile of the power supply network.

4. The method of claim 1, wherein the in-field measurement devices comprise phasor measurement units that provide a time series of measurement data in different measurement channels.

5. The method of claim 2, wherein the respective neural attention model comprises a convolutional layer to smooth measurement data received by an associated in-field measurement device of the power supply network.

6. The method of claim 1, wherein the neural attention model associated with a corresponding in-field measurement device of the power supply network comprises at least one recurrent neural network layer to capture a time dependency of the received measurement data.

7. The method of claim 6, wherein the neural attention model associated with an in-field measurement device of the power supply network comprises an attention layer that weights outputs of a last recurrent neural network layer of the neural attention model with an output of an associated feed-forward attention subnetwork receiving channel-wise context information data indicating a steady state of the power supply network at the respective in-field measurement device.

8. The method of claim 1, wherein the neural attention model associated with a corresponding in-field measurement device of the power supply network comprises a classification layer that receives weighted outputs of a last recurrent neural network layer of the neural attention network to calculate a local network state profile for the power supply network at the respective in-field measurement device indicating a predicted class probability distribution over contingency classes.

9. The method of claim 1, wherein each of the reference contingency profiles stored in the reference contingency database comprises a reference global network state profile and a reference relevance profile.

10. The method of claim 1,
    wherein the method further comprises:
       calculating, for each of the reference contingency profiles stored in the reference contingency database, a first similarity metric depending on the global network state profile of the candidate contingency profile and depending on the global network state profile of the reference contingency profile; and
       calculating a second similarity metric depending on the relevance profile of the candidate contingency profile and depending on the relevance profile of the reference contingency profile;
    wherein the final similarity metric indicating the similarity between the candidate contingency profile and the respective reference contingency profile is computed as a function of the calculated first similarity metric and the calculated second similarity metric.

11. The method of claim 1, further comprising preprocessing the measurement data generated by each in-field measurement device of the power supply network, such that a standard deviation of the measurement data from an expected value in a steady state is provided for each measurement channel of the respective in-field measurement device.

12. The method of claim 11, further comprising rescaling the respective preprocessed measurement data, the rescaling comprising dividing the respective preprocessed measurement data through the channel and the in-field measurement device specific standard deviation.

13. The method of claim 11, further comprising calculating a relevance weight for each in-field measurement device, calculating the relevance weight comprising normalizing the standard deviation of the measurement data of the respective in-field measurement device, such that the relevance profile of the power supply network is provided.

14. The method of claim 1, wherein the neural attention models are trained with measurement data of observed contingencies of the power supply network.

15. A monitoring system configured to recognize contingencies in a power supply network, the monitoring system comprising:
   in-field measurement devices configured to generate measurement data of the power supply network;
   a processor configured to:
      process the measurement data generated by the in-field measurement devices of the power supply network by associated neural attention models, such that a global network state profile of the power supply network is provided, the global network state profile comprising for the in-field measurement devices of the power supply network a class probability distribution over contingency classes;
      process the measurement data generated by the in-field measurement devices of the power supply network, such that a relevance profile of the power supply network is provided, the relevance profile comprising for the in-field measurement devices a relevance distribution indicating a probability where an origin of a contingency within the power supply network resides;
      form a candidate contingency profile by the global network state profile and the relevance profile of the power supply network;
      compare the candidate contingency profile with reference contingency profiles stored in a reference contingency database of the monitoring system, such that contingencies are recognized in the power supply network; and
      compute, for each of the reference contingency profiles stored in the reference contingency database, a similarity metric indicating a similarity between the candidate contingency profile and the respective reference contingency profile, wherein the contingency is recognized based on the computed similarity metric and one or more countermeasures are performed to remove the recognized contingency.

16. The monitoring system of claim 15, wherein the in-field measurement devices comprise phasor measurement units that provide a time series of measurement data in different measurement channels.

17. The monitoring system of claim 15, wherein each neural attention model comprises:
   a convolutional layer configured to smooth measurement data received by an associated in-field measurement device of the power supply network;
   at least one recurrent neural network layer configured to capture a time dependency of the received measurement data; and
   a classification layer configured to weight the received outputs of a last recurrent neural network layer of the at least one recurrent neural network layer of the neural attention network, such that a local network state profile is calculated for the power supply network at the respective in-field measurement device indicating a predicted class probability distribution over contingency classes.

18. The method of claim 10, wherein the function of the calculated first similarity metric and the calculated second similarity metric comprises an average of the first similarity metric and the second similarity metric.

* * * * *